Patented Dec. 16, 1947

2,432,970

UNITED STATES PATENT OFFICE 2,432,970

METHOD OF REDUCING THE PYROGEN CONTENTS OF PARENTERAL SOLUTIONS

Frederick Paul Pingert, Port Byron, and Clayton W. Ferry, Tuckahoe, N. Y., assignors to Burroughs Wellcome & Co. (U. S. A.) Inc., New York, N. Y., a corporation of New York No Drawing. Application August 9, 1946, Serial No. 689,510

4 Claims. (Cl. 195—2)

The present invention relates to a method of reducing the pyrogen content of parenteral solutions and particularly to a method of preparing parenteral solutions of enzymatic protein hydrolysates with low pyrogen content.

Pyrogens occur generally in solutions which at some stage of their preparation are subject to contamination with bacteria or which comprise pyrogen containing ingredients. In order to render such solutions suitable for intravenous injection it is necessary to keep the pyrogen content within certain permissible limits and preferably to reduce the pyrogen content below the limit at which perceptible rise in body temperature is caused by the injection of such solutions.

Pyrogens can be destroyed by raising the temperature of the solution to about 260° C., but this method of removing pyrogens is not applicable to solutions which are sensitive to high temperatures.

Other methods of destroying pyrogens are to treat the solutions or the ingredients with acids or alkalies or to filter the solution through asbestos pads. (See for instance "Removal of bacterial pyrogens from protein hydrolysates," Journal of Laboratory and Clinical Medicine, vol. 30, No. 1, pp. 75 to 79.)

These methods are frequently cumbersome and impractical especially if the solutions or their ingredients are sensitive to acid or alkaline conditions under which pyrogens are destroyed, or contain high molecular organic compounds which render adsorption of pyrogens on asbestos pads ineffective. This is particularly true with solutions of enzymatic protein hydrolysates because such solutions cannot be heated to temperatures above about 120° C. without injury to some of the essential amino acids in the protein hydrolysates, they cannot be made strongly acid or alkaline without losing at least part of their clinical value, and the removal of pyrogens from such solutions by filtration through asbestos pads is impractical, probably because of the presence of high molecular substances such as peptides in the protein hydrolysates. (See last paragraph of article referred to above.)

The principal object of the invention is to provide a method of reducing the pyrogen contents of parenteral solutions which are sensitive to temperatures and to acid and alkaline conditions at which pyrogens are destroyed, and from which pyrogens cannot be conveniently removed by adsorption filtration.

A specific object of the invention is to prepare enzymatic protein hydrolysates and particularly enzymatic casein hydrolysates with low pyrogen content.

Recent investigations suggested that the pyrogenic materials which produce a rise in body temperature are, at least to a considerable extent, classifiable as polysaccharides.

According to the present invention it has been found that these pyrogens can be destroyed to a significant degree by a treatment with amylolytic enzymes capable of hydrolyzing such polysaccharides. The enzymes may be of vegetable or animal origin and are conveniently mixtures of alpha- and beta-amylases. It is believed at present, that the pyrogen destroying activity is largely associated with the alpha-amylase fraction.

Accordingly, the objects of the present invention are accomplished by treating parenteral solutions having an undesirable pyrogen content with an amylolytic enzyme preparation of the type mentioned at a temperature at which hydrolysis of the polysaccharide pyrogens is promoted, then raising the temperature of the solution sufficiently to destroy the enzymes, and filtering the solution under pyrogen free conditions.

The process is particularly applicable to pyrogen containing solutions of enzymatic protein hydrolysates and has been shown to be effective at high concentrations of such hydrolysates.

In general, the method of preparing parenteral solutions of enzymatic protein hydrolysates, and particularly of enzymatic casein hydrolysates, with low pyrogen content, according to the invention comprises the steps of adding to a solution containing from about 4 g. to about 25 g. (dry weight) of an enzymatic protein hydrolysate such as for instance, an enzymatic casein hydrolysate, in 100 cc. of water about 1% to 10% (dry weight by dry weight of hydrolysate) of an amylolytic enzyme preparation at a temperature at which enzymatic activity is promoted, then raising the temperature of the solution to between about 80° C. and 120° C. to destroy the enzymes, and filtering under pyrogen free conditions. The filtrate may then be bottled under aseptic conditions or bottled and sterilized in the usual manner.

The following examples may serve to illustrate the invention without limiting its scope.

Example 1

A solution of 25 g. of an enzymatic casein hydrolysate in 100 cc. of pyrogen free water was treated with 2 g. of a commercial diastase preparation containing 100 Wolgemuth amylase units per g. (containing about 0.3 g. of enzymes) at 43° C. for 21 days. Toluene and chloroform were added to the solution as preservatives. At the end of this period the enzymes were destroyed by heating to a temperature of about 95° C., the organic solvents were removed under reduced pressure and the solution was filtered through paper under pyrogen free conditions, bottled and sterilized in the usual manner. A parallel control without the enzyme was run. The results of the pyrogen screening tests made according to U. S. P., but with only two rabbits instead of five rabbits for each sample were as follows:

Untreated control:
 +1.35° C.
 +1.95° C.
Enzyme treated sample:
 +0.45° C.
 +0.70° C.

From table 1 in the paper "Removal of bacterial pyrogens from protein hydrolysates," referred to above, it will be seen that these temperature rises are associable with pyrogen quantities differing by about two orders of magnitude (10.0.1) so that about 99% of the pyrogens present in the untreated control appear to have been destroyed by the enzyme treatment.

Example 2

A solution of 20 g. of an enzymatic casein hydrolysate in 100 cc. of pyrogen free water containing 5 cc. of an alpha-amylase concentrate containing 130 Wolgemuth amylase units per cc. (1.14 g. dry weight) was incubated at 70° C. for about 40 minutes. At the end of this period the temperature was raised to 85° C. The solution was then filtered through paper under pyrogen free conditions, bottled and sterilized. A parallel control without enzymes was run simultaneously. The results of the pyrogen screening tests were as follows:

Untreated control:
 +2.10° C.
 +1.90° C.
Enzyme treated sample:
 +1.20° C.
 +1.50° C.

It may be noted that the original pyrogen content of this batch of hydrolysate was considerably higher than that of the hydrolysate used in Example 1. The relative ratio of pyrogen content between treated sample and control is again about two orders of magnitude (100:1), indicating a destruction of about 99% of the originally present pyrogens.

Example 3

Two 20 g. samples of an enzymatic casein hydrolysate were each dissolved in 200 cc. of distilled water and to one of the solutions were added 2 g. of U. S. P. amylopsin. Both samples were incubated at 43° C. for 3½ weeks. At the end of this period the enzymes were destroyed by heating to a temperature of about 95° C. and the solution was filtered under pyrogen free conditions, bottled and sterilized. Pyrogen screening tests yielded the following results:

Untreated control:
 +1.05° C.
 +1.35° C.
 +1.50° C.
Enzyme treated sample:
 +0.1° C.
 +0.3° C.

In this case a very decided reduction of the pyrogen content was observed.

Example 4

Two 20 g. samples of an enzymatic casein hydrolysate were each dissolved in 200 cc. of distilled water and to one was added 2 g. of a commercial diastase preparation as used in Example 1. Both samples were incubated at 43° C. for 3½ weeks. Pyrogen tests on the filtered, sterilized solutions yielded the following results:

Untreated control:
 +1.05° C.
 +1.35° C.
 +1.50° C.
Enzyme treated sample:
 −0.6° C.
 +0.1° C.

In this case a practically complete elimination of the pyrogens had been obtained.

Example 5

An experiment similar to that described in Example 4 was run on an enzymatic casein hydrolysate solution containing 4 g. of hydrolysate in 100 cc. of distilled water. The experiment resulated in the reduction of the pyrogen content within the range of the reduction obtained by the treatment described in Example 1.

We claim:

1. A method of reducing the bacterial pyrogen content of parenteral solutions of enzymatic protein hydrolysates comprising the step of treating such solution with an amylolytic enzyme preparation at a temperature between about 43° C. and 70° C., thus promoting enzymatic activity, then raising the temperature of the solution to about 80° C. to 120° C. to destroy the enzymes and filtering the solution under pyrogen free conditions.

2. A method of reducing the bacterial pyrogen content of parenteral solutions containing between about 4 g. and about 25 g. of an enzymatic casein hydrolysate in 100 g. of water, comprising the steps of treating such solution with an amylolytic enzyme preparation at a temperature between 43° C. and 70° C., thus promoting enzymatic activity, then raising the temperature of the solution to about 80° C. to 120° C. to destroy the enzymes and filtering the solution under pyrogen free conditions.

3. A process of lowering the bacterial pyrogen content of parenteral solutions of enzymatic casein hydrolysates which process comprises the steps of dissolving 25 g. of an enzymatic casein hydrolysate in 100 cc. of water, adding to the solution 2 g. of a commercial diastase preparation containing about 0.3 g. of enzymes under conditions suitable to prevent the growth of bacteria, keeping the solution at 43° C. for 21 days, then heating the solution to 95° C. to destroy the enzymes, and filtering under pyrogen free conditions.

4. A process of lowering the bacterial pyrogen content of parenteral solutions of enzymatic casein hydrolysates, which process comprises the steps of incubating a solution of 20 g. of an enzymatic casein hydrolysate in 100 cc. of water containing 5 cc. of an alpha-amylase concentrate (1.14 g. of dry enzymes) at 70° C. for about 40 minutes, raising the temperature at the end of this period to about 85° C., and filtering under pyrogen free conditions.

FREDERICK PAUL PINGERT.
CLAYTON W. FERRY.

REFERENCES CITED

The following references are of record in the file of this patent:

UNITED STATES PATENTS

| Number | Name | Date |
|---|---|---|
| 1,858,820 | Douglas | May 17, 1932 |

OTHER REFERENCES

Zittle et al., J. of Lab. & Clinical Medicine, vol. 30, page 77 (1945).